United States Patent
Frederick et al.

(10) Patent No.: US 10,277,562 B1
(45) Date of Patent: Apr. 30, 2019

(54) CONTROLLING ENCRYPTED TRAFFIC FLOWS USING OUT-OF-PATH ANALYSIS DEVICES

(71) Applicant: Symantec Corporation, Mountain View, CA (US)

(72) Inventors: Ronald Andrew Frederick, Mountain View, CA (US); Srinivas Yerra, Sunnyvale, CA (US); Tarun Soin, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 147 days.

(21) Appl. No.: 15/381,462

(22) Filed: Dec. 16, 2016

Related U.S. Application Data (60) Provisional application No. 62/277,662, filed on Jan. 12, 2016.

(51) Int. Cl.
| | | |
|---|---|---|
| *H04L 9/32* | (2006.01) | |
| *H04L 29/06* | (2006.01) | |
| *H04L 12/851* | (2013.01) | |
| *H04L 12/26* | (2006.01) | |

(52) U.S. Cl.
CPC ........ *H04L 63/0428* (2013.01); *H04L 9/3263* (2013.01); *H04L 43/04* (2013.01); *H04L 47/2408* (2013.01); *H04L 47/2483* (2013.01); *H04L 69/16* (2013.01)

(58) Field of Classification Search
CPC . H04L 63/0428; H04L 47/2483; H04L 69/16; H04L 47/2408; H04L 9/3263; H04L 43/04
USPC .......................................................... 713/168
See application file for complete search history.

(56) References Cited

U.S. PATENT DOCUMENTS

| | | | | |
|---|---|---|---|---|
| 7,281,269 | B1 * | 10/2007 | Sievers | ................... H04L 51/12 713/161 |
| 2016/0072811 | A1 * | 3/2016 | Bollay | .................. H04L 63/166 713/170 |

* cited by examiner

*Primary Examiner* — Mohammad W Reza
(74) *Attorney, Agent, or Firm* — Holland & Hart LLP (57) ABSTRACT

In one embodiment, a first device in a network receives intercepted traffic that has been encrypted. The first device decrypts the intercepted traffic and sends the decrypted traffic to one or more analysis devices in the network. The first device receives a message indicative of a result of analysis of the decrypted traffic by the one or more analysis devices.

19 Claims, 8 Drawing Sheets

CONTROLLING ENCRYPTED TRAFFIC FLOWS USING OUT-OF-PATH ANALYSIS DEVICES

CROSS REFERENCES

The present Application for Patent claims priority to U.S. Patent Application No. 62/277,662 by Soin et al., entitled "Controlling Encrypted Tap Connections Using Out-Of-Path Intrusion Analysis Devices," filed Jan. 12, 2016, which is assigned to the assignee hereof and is incorporated by reference in its entirety.

FIELD OF THE DISCLOSURE

The present disclosure relates generally to computer networks and, more particularly, to controlling encrypted traffic flows using out-of-path analysis devices.

BACKGROUND

Encryption is used for a variety of different online purposes. In some cases, encryption may be used from a networking standpoint, to establish virtual private network (VPN) tunnels between network routers. Encryption can also be used to group geographically separated devices in to a virtual local area network (VLAN). Encryption techniques may further be used to convey certain types of network traffic. For example, a banking website may use encryption, to protect the privacy of any exchanged data, such as a customer's personal information. In another example, an email server may use encryption to protect the contents of messages exchanged across the network.

Despite the proliferation of encryption in computing systems, encryption also presents a number of challenges to organizations. Notably, encrypted traffic may be opaque to the various intrusion detection and prevention systems used by an organization. Thus, a malicious entity may attempt to infiltrate the network of an organization by concealing an attack within encrypted traffic.

SUMMARY

According to embodiments herein, a method for controlling encrypted traffic flows using out-of-path analysis devices is described. The method includes receiving, at a first device in a network, intercepted traffic that has been encrypted. The method also includes decrypting, by the first device, the intercepted traffic. The method further includes sending, by the first device, the decrypted traffic to one or more analysis devices in the network. The method additionally includes receiving, at the first device, a message indicative of a result of analysis of the decrypted traffic by the one or more analysis devices.

In some embodiments, the message may identify an action to be performed by the first device on the traffic.

In some embodiments, the method may further include performing, by the first device, the indicated action on the traffic. In some embodiments, the indicated action may include at least one of: dropping the traffic, logging the traffic, stopping decryption of the traffic, adjusting a differential services code point (DSCP) or type-of-service field of the traffic, or adjusting a bandwidth associated with the traffic.

In some embodiments, the message may indicate the action to be performed using a transport control protocol (TCP) option field and one or more TCP flags. In some embodiments, the message may further identify a pseudo-connection associated with the traffic at the first device.

In some embodiments, the message may be received via one or more dedicated control channels between the first device and the one or more analysis devices.

In some embodiments, the message may include metadata regarding the result of the analysis of the traffic by the one or more analysis devices.

In some embodiments, the method may further include performing, by the first device, one or more actions based at least in part on the received message.

In some embodiments, the decrypted traffic may include a decrypted payload of the traffic in plaintext format.

In some embodiments, the decrypted traffic may include a re-encrypted payload of the traffic.

In some embodiments, the method may further include selecting, by the first device, the one or more analysis devices to which the decrypted traffic is to be sent based on a type of the traffic.

In some embodiments, the first device may comprise the one or more analysis devices, such that the analysis of the decrypted traffic is performed by the first device.

In further embodiments, an apparatus to control encrypted traffic flows using out-of-path analysis devices is described. The apparatus may include one or more network interfaces to communicate with a network. The apparatus may also include a processor coupled to the network interfaces and configured to execute one or more processes. The apparatus may further include a memory configured to store a process executable by the processor. When executed, the process may be operable to receive intercepted traffic that has been encrypted. The process may also be operable to decrypt the intercepted traffic, when executed. The process may be further operable to send the decrypted traffic to one or more analysis devices in the network, when executed. The process may be additionally operable to receive a message indicative of a result of analysis of the decrypted traffic by the one or more analysis devices, when executed.

In other embodiments, a non-transitory tangible, computer-readable media having software encoded thereon is described. When executed by a processor of a first device, the software may be operable to receive intercepted traffic that has been encrypted. The software may also be operable to decrypt the intercepted traffic, when executed. The software may be further operable to send the decrypted traffic to one or more analysis devices in the network, when executed. The software may be additionally operable to receive a message indicative of a result of analysis of the decrypted traffic by the one or more analysis devices, when executed.

BRIEF DESCRIPTION OF THE DRAWINGS

The embodiments herein may be better understood by referring to the following description in conjunction with the accompanying drawings in which like reference numerals indicate identically or functionally similar elements, of which.

In the figures, reference numbers refer to the same or equivalent parts of the present invention throughout the several figures of the drawing.

DESCRIPTION OF EXAMPLE EMBODIMENTS

According to the techniques described herein, systems and methods are described that implement an interface to a tap device that is operable to intercept encrypted traffic and decrypt the traffic. In some aspects, the interface allows one or more analysis devices to analyze the decrypted traffic in parallel, which offers lower latency than if each analysis device is separately inserted inline. In further aspects, policies may be implemented in the system, to control which traffic is decrypted and analyzed, as well as which analysis devices are to analyze the decrypted traffic, if any. Additional policies may be implemented to control which actions, if any, should be taken with respect to the encrypted traffic, based on the analysis of the decrypted traffic by the analysis device(s).

Figure 1A:
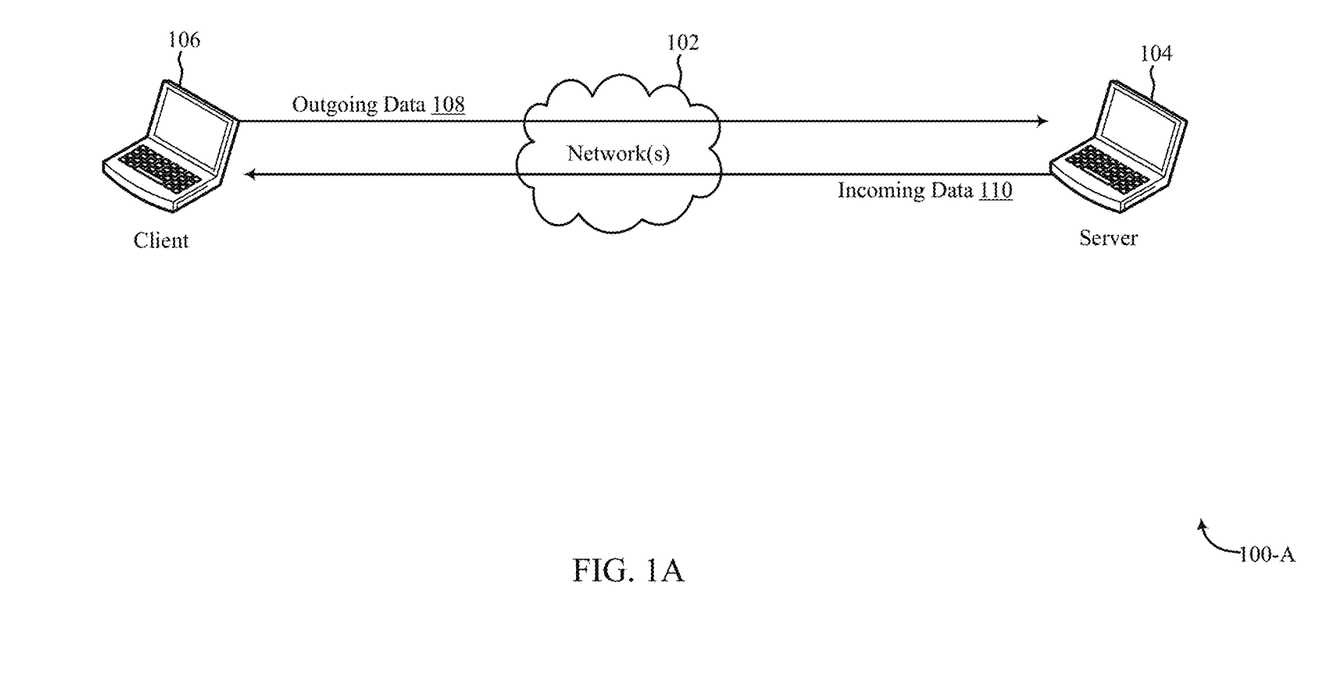
FIGS. 1A-1B illustrate an example computing system, according to various embodiments.

FIG. 1A illustrates an example computer system 100, according to various embodiments. As shown, a client device 106 may be in communication with a server 104 via one or more computer networks 102. As will be appreciated, network(s) 102 may include, but are not limited to, local area networks (LANs), wide area networks (WANs), the Internet, cellular networks, infrared networks, satellite networks, or any other form of data network configured to convey data between computing devices.

Networks 102 may also include any number of wired or wireless links between client device 106 and server 104. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, combinations thereof, or the like. Example wireless links may include, but are not limited to, near field-based links, WiFi links, satellite links, cellular links, infrared links, combinations thereof, or the like.

Server 104 may be of any form of computing device operable to provide remote services to one or more client devices, such as client device 106. For example, server 104 may be a rack-based server, a desktop-based server, a blade server, or the like. In some embodiments, server 104 may be part of a data center in which multiple servers are hosted. In further embodiments, server 104 may be part of a cloud computing environment.

Client device 106 may be of any form of electronic device operable to communicate via network(s) 102. For example, client device 106 may be a desktop computer, a laptop computer, a tablet device, a smartphone, a wearable electronic device (e.g., a smart watch, a head up display, etc.), a smart television, a set-top device for a television, etc.

As shown, client device 106 may send outgoing data 108 to server 104 (e.g., to request certain data from server 104, to post certain data to server 104, etc.). For example, outgoing data 108 may execute a HyperText Transfer Protocol (HTTP) GET command, to retrieve webpage data from server 104. Client device 106 may address outgoing data 108 to an Internet Protocol (IP) address or another form of network locator for server 104. In some cases, client device 106 may determine the address of server 104 by first performing a lookup of a Universal Resource Locator (URL), e.g., using a domain name system (DNS).

Server 104 may also provide incoming data 110 to client device 106 via network(s) 102. For example, in response to receiving a request for a webpage from client device 106, server 104 may retrieve the corresponding webpage data and send the retrieved data to client device 106 as part of incoming data 110.

Various encryption techniques may be used to encrypt the incoming and/or outgoing data 108-110 exchanged between server 104 and client device 106. For example, server 104 and client device 106 may use the HTTP Secure (HTTPS) protocol, to secure the connection between server 104 and client device 106. Example encryption techniques that may be used with HTTPS include secure socket layer (SSL) encryption and transport layer security (TLS). In these and other cases, client device 106 and server 104 may use a public key infrastructure (PKI) methodology, to establish the secured connection.

Generally, PKI-based encryption employs the use of public and private keys, to encrypt and decrypt the exchanged data 108, 110. In one example of operation, assume that client device 106 is to establish an SSL connection with server 104. First, a certificate authority (CA) (e.g., GoDaddy™, Symantec™, etc.) may distribute a root certificate to client device 106. In response to receiving a webpage request from client device 106, server 104 may request a corresponding website certificate from the CA. The CA may sign the website certificate with its own root certificate, which may be sent back to client device 106 via server 104. In turn, client device 106 may use its root certificate issued by the CA to verify that the signed website certificate is trusted.

In particular, in one embodiment, establishing an SSL connection between client device 106 and server 104, for example, may entail three separate stages: 1.) negotiation, 2.) secret sharing, and 3.) handshake completion. During the negotiation stage, client device 106 may send a "ClientHello" message to server 104 that indicates the encryption algorithms supported by client device 106 and a first random number. In response, server 104 may issue a "ServerHello" message back to client device 106 that includes a second random number and an SSL certificate. Client device 106 may then verify the SSL certificate, extract the public key of server 104, use the public key to encrypt a Pre-Master secret with the public key, and send the encrypted Pre-Master secret back to server 104.

During the secret sharing stage, client device 106 may compute a master secret using the first random number, the second random number provided to client device 106 by server 104, and the pre-master secret. Server 104 may similarly compute the master secret using the first random number provided to server 104 by client device 106, the second random number computed locally by server 104, and the pre-master secret received from client device 106. At this point, both client device 106 and server 104 have the same Master secret.

During the handshake completion stage, in some embodiments client device 106 may send a "ClientFinish" message to server 104 that includes a hash using the Master secret. In response, server 104 may compare the received hash of the master secret to a locally-calculated hash of the Master secret determined by server 104 in the secret sharing stage. Server 104 may then perform a similar action by creating its own hash using the master secret and providing this hash to client device 106 as part of a "ServerFinish" message. Client device 106 may then compare the received hash to the hash included in the ClientFinish message. Assuming that the hashes compared during the handshake completion stage match, client device 106 and server 104 may conclude that the respective devices are trusted and establish the secure connection.

Figure 1B:
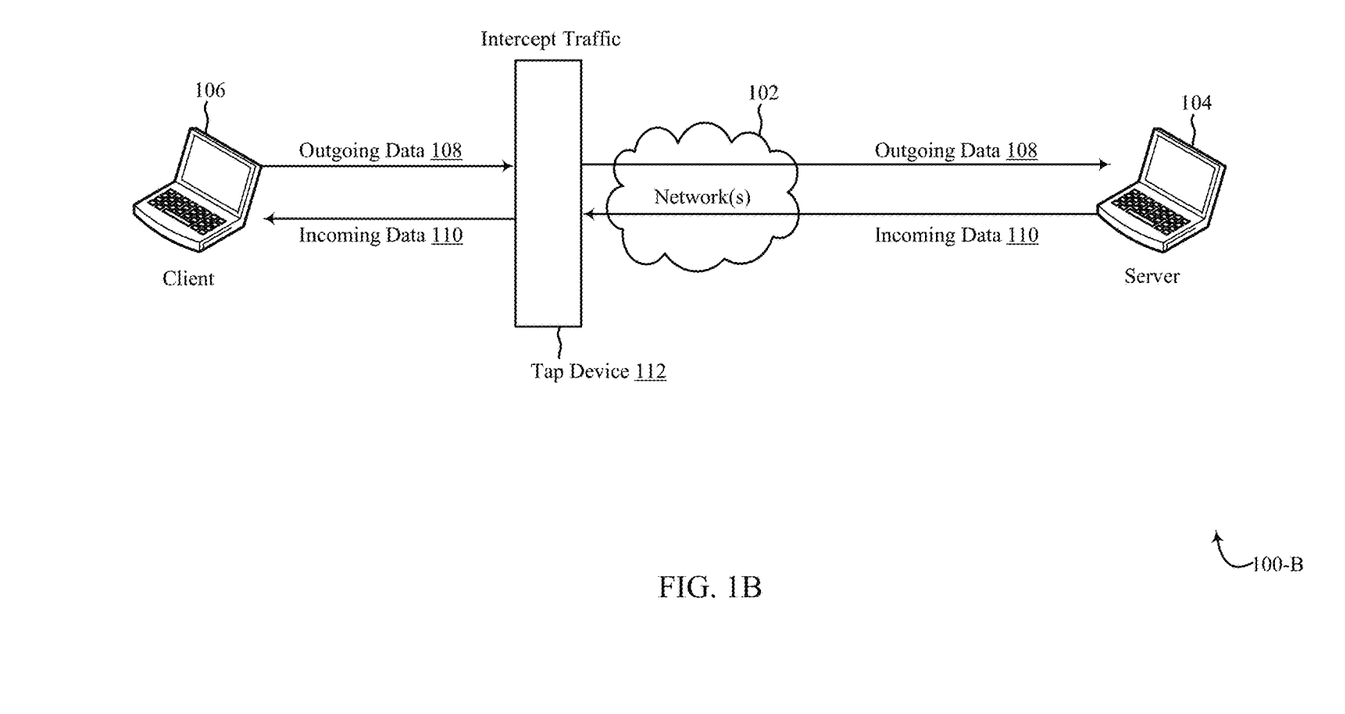

Referring now to FIG. 1B, computer system 100 may also include a tap device 112 operable to intercept encrypted data 108, 110 sent between client device 106 and server 104, according to various embodiments. In some embodiments, tap device 112 may be implemented as a stand-alone device in communication with an edge router that redirects traffic to tap device 112. For example, assume that client device 106 is on a local network serviced by an edge router that provides connectivity between the local network and a provider network. In such a case, the router may forward any received traffic to tap device 112 for further processing. In other embodiments, the functionality of tap device 112 may be integrated directly into a networking device along the direct traffic path between client device 106 and server 104 (e.g., into the router itself, into a switch, into a virtualized networking device, etc.).

According to various embodiments, tap device 112 may act as a man-in-the-middle with respect to client device 106 and server 104. In such a configuration, tap device 112 may relay messages sent between client device 106 and server 104, without the knowledge of either or both of the end devices. In doing so, tap device 112 may insert itself into the encryption process such that tap device 112 has the information necessary to decrypt any encrypted messages passed between client device 106 and server 104.

In one example of operation, assume that client device 106 attempts to establish an SSL connection with server 104 by sending a ClientHello message. Rather than transmitting the message to server 104, the message may be redirected to tap device 112. In one embodiment, tap device 112 may then issue a ServerHello message back to client device 106, such that client device 106 believes that the ServerHello message was sent by server 104. In turn, client device 106 and tap device 112 may complete the SSL handshake. In addition to performing a handshake with client device 106, tap device 112 may perform its own handshake with server 104. As a result, client device 106 may believe that it is communicating securely with server 104 when, in fact, all incoming and outgoing data 108, 110 is directed through tap device 112.

By replacing a single handshake between client device 106 and server 104 with separate handshakes between these devices and tap device 112, tap device 112 now has the information (e.g., keys, secrets, etc.) needed for tap device 112 to decrypt any encrypted outgoing or incoming data 108, 110. For example, since client device 106 has performed a handshake with tap device itself 112 instead of server 104, tap device 112 can use the master secret associated with client device 106 and the corresponding keys, to decrypt the encrypted outgoing data 108. Similarly, since tap device 112 performed a separate handshake with server 104, tap device 112 will be able to decrypt any encrypted incoming data 110 sent by server 104.

In various embodiments, tap device 112 may decrypt the payloads of the decrypted data 108, 110 into plaintext for further analysis by any number of analysis devices, as described in greater detail below. Thus, traffic that would otherwise be excluded from analysis may be assessed to determine whether the traffic is suspicious and/or to initiate any corrective measures as needed.

Figure 2:
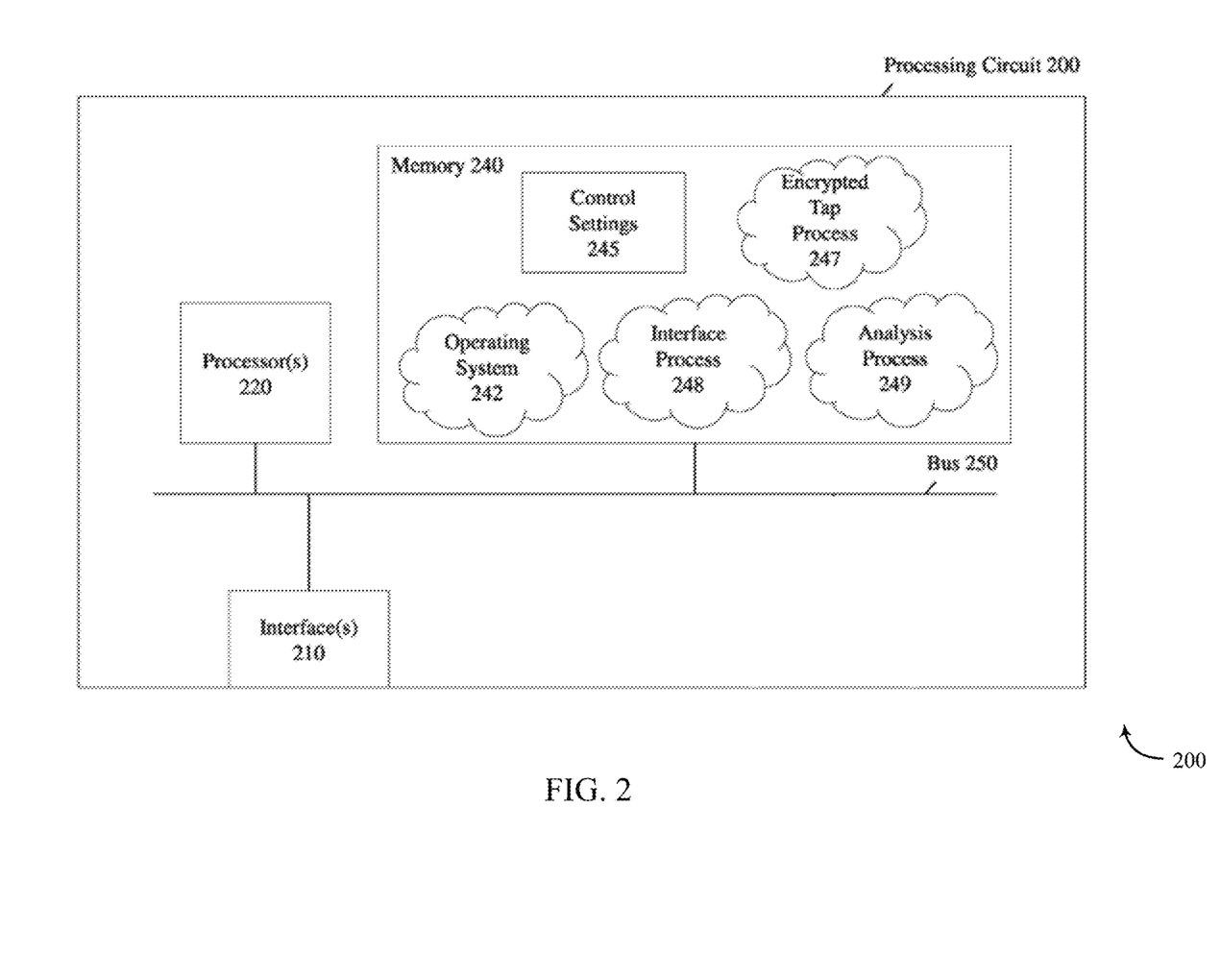
FIG. 2 illustrates an example processing circuit, according to various embodiments.

Referring now to FIG. 2, a schematic block diagram of an example processing circuit 200 that may be used with one or more embodiments described herein, e.g., as part of tap device 112, an analysis device in communication with tap device 112, or another device specifically configured to perform the functions described herein. As shown, processing circuit 200 may comprise one or more network interfaces 210 (e.g., wired, wireless, etc.), at least one processor 220, and a memory 240 interconnected by a system bus 250 and powered by a power supply 260.

The network interface(s) 210 contain the mechanical, electrical, and signaling circuitry for communicating data with other computing devices in system 100 (e.g., via network(s) 102. The network interfaces may be configured to transmit and/or receive data using a variety of different communication protocols. Note, further, that processing circuit 200 may have two different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Memory 240 may include any effective form of memory, including but not limited to local memory, volatile memory such as random-access memory (RAM), persistent memory such as disk storage, and the like. The processor 220 may comprise hardware elements or hardware logic adapted to execute the software programs and manipulate data structures, such as control settings 245. An operating system 242, portions of which are typically resident in memory 240 and executed by the processor, functionally organizes the device by, inter alia, invoking operations in support of software processes and/or services executing on the device. These software processes and/or services may comprise an encrypted tap process 247, a tap interface process 248, and/or a traffic analysis process 249, as described herein. Although illustrated as separate processes, one or more of the encrypted tap process 247, tap interface process 248, and/or traffic analysis process 249 may be performed by the processing circuit 200 as a whole using multiple processors in any combination.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

According to various embodiments, encrypted tap process 247 may be configured to cause processing circuit 200 to act as a man-in-the-middle between two devices attempting to establish a secure network connection. Notably, encrypted tap process 247 may be operable to perform separate handshakes with the devices at each end of the connection and relay any communications between the two devices using the separate secure sessions. By doing so, either or both of the communicating devices may not have knowledge that their messages are not secured with the opposing device. In addition, by performing the handshakes between the devices and encrypted tap process 247, encrypted tap process 247 will have the information needed to decrypt the traffic and may decrypt the traffic as needed.

Tap interface process 248 may be operable, when executed by processor(s) 220, to interface encrypted tap process 247 with one or more other devices via network interface(s) 210. For example, tap interface process 248 may allow encrypted tap process 247 to pass decrypted, intercepted traffic to the analysis processes. In one embodiment, the analysis processes may run on the same environment; in other embodiments, the analysis processes may run on separate environments. For example, in some embodiments, the encrypted tap process 247 may pass decrypted, intercepted traffic to one or more remote analysis devices. In other examples, the encrypted tap process 247 may analyze the decrypted, intercepted traffic locally, on the same environment. In turn, any number of analysis devices may listen promiscuously to the tap interface. In some embodiments, interface process 248 may implement any number of dedicated, secure connections between encrypted tap process 247 and the analysis devices. In particular, interface process 248 may use a customized message format, to allow additional data to be conveyed between processing circuit 200 and the one or more analysis devices.

Traffic analysis process 249 may be operable, generally, to analyze any decrypted, intercepted traffic provided via the tap interface implemented by tap process 247, in various embodiments. In some embodiments, traffic analysis process 249 may perform intrusion detection and/or intrusion protection functions with respect to the traffic decrypted by the tap device. In other embodiments, traffic analysis process 249 may be operable to identify and/or remove any information from the decrypted traffic, according to one or more policies. For example, traffic analysis process 249 may flag any traffic that contains confidential information that should not be communicated outside of a given organization.

In some embodiments, traffic analysis process 249 may provide an indication of the analysis results back to encrypted tap process 247 via the tap interface (e.g., the actual results, an instruction based on the analysis, etc.). In such a case, encrypted tap process 247 may perform any number of actions on the analyzed traffic based on the received indication, such as, but not limited to, resetting the connection, dropping or blocking the traffic, allowing the traffic to proceed without further decryption or analysis, etc.

Control settings 245 may include any number of parameters, rules, etc., that control the functionality of processes 247-249, according to various embodiments. For example, control settings 245 may specify the conditions under which encrypted tap process 247 is to decrypt traffic (e.g., based on the type of traffic, source of the traffic, destination of the traffic, user groups, etc.). In another example, control settings 245 may specify which analysis devices, if any, are to analyze traffic decrypted by encrypted tap process 247. In yet further cases, control settings 245 may include rules or other policies that control how traffic analysis process 249 analyzed the decrypted traffic and/or the corresponding actions based on the analysis (e.g., certain types of traffic content should be blocked, etc.).

In various embodiments, processes 247-249 may be implemented on a single device or, alternatively, across multiple processing circuits in communication with one another. For example, in some cases, encrypted tap process 247 may be executed by a stand-alone tap device, while analysis process 249 may be executed by a stand-alone analysis device. In further embodiments, processes 247-249 may be executed within a virtual machine (VM) environment, that may be spawned as needed by a networking device.

Figure 3A:
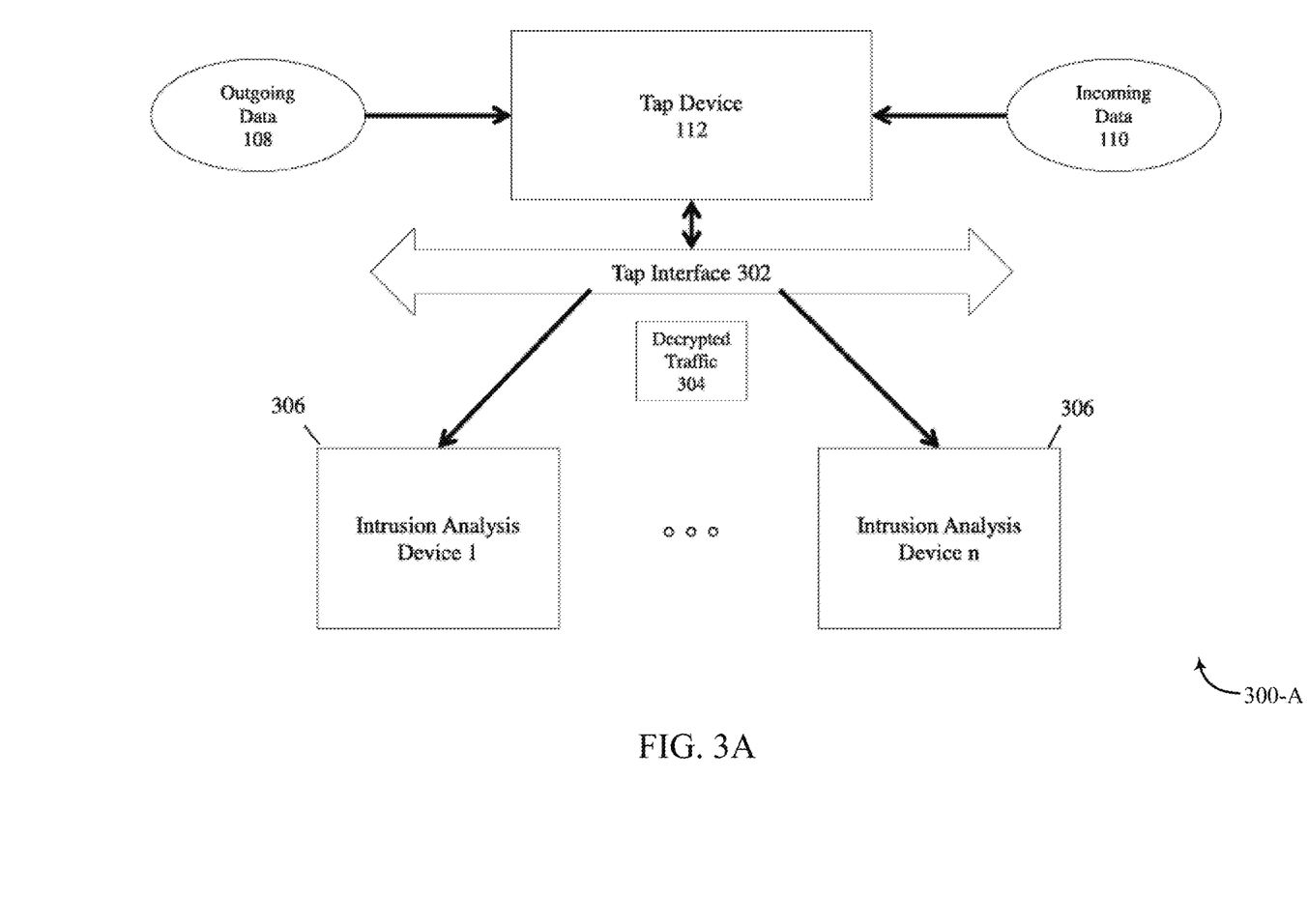
FIGS. 3A-3B illustrate an example architecture for performing intrusion analysis on encrypted traffic, according to various embodiments.
Figure 3B:
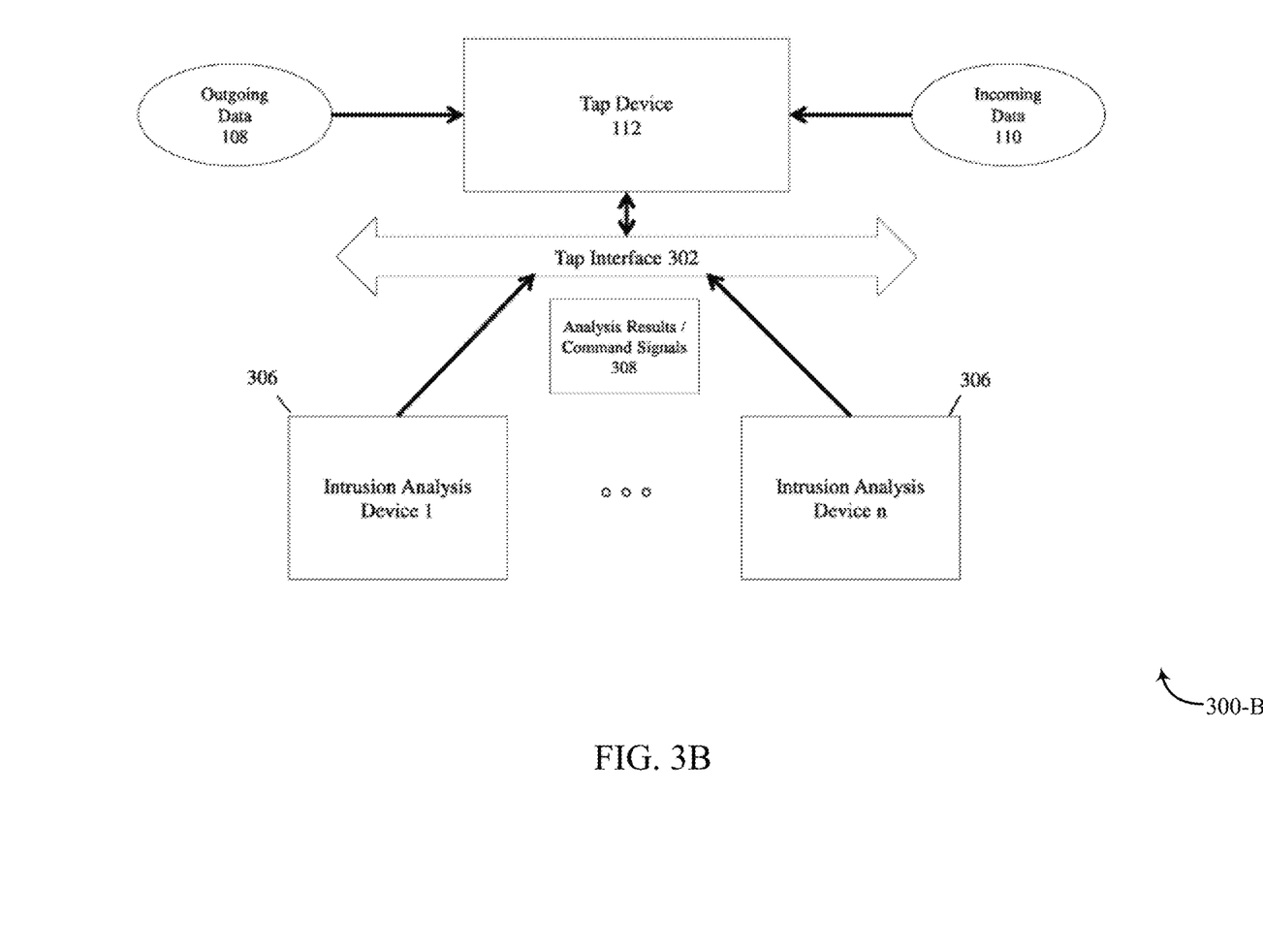

Referring now to FIGS. 3A-3B, an example architecture 300 is shown for performing analysis on encrypted traffic, according to various embodiments. As shown in FIG. 3A, tap device 112 may decrypt any encrypted outgoing and/or incoming data 108, 110 (e.g., by executing encrypted tap process 247 to act as a man-in-the-middle) into decrypted traffic 304, as described above. In addition, tap device 112 may implement a tap interface 302 (e.g., by executing interface process 248). Also as shown, architecture 300 may include any number of intrusion analysis devices 306 (e.g., a first device through nth device) that may be interfaced with tap device 112 via tap interface 302.

Generally, intrusion analysis devices are specialized network appliances that are configured to analyze network traffic, for purposes of identifying traffic that may be potentially harmful to the protected local network. One form of an analysis device is an intrusion detection system (IDS), which analyzes traffic to detect suspicious activities. For example, an IDS may analyze traffic volumes, the source/destination of the traffic, the type of traffic, the traffic payloads, or any other information that may indicate that the traffic is suspicious. If so, the IDS may generate a notification to a network administrator, log information regarding the suspicious traffic, or perform other such functions. An extension to an IDS is an intrusion prevention system (IPS). In addition to detecting suspicious traffic, an IPS may also be operable to take preventative measures, to protect the local network. For example, an IPS may, based on one or more policies, determine that the connection of the traffic should be reset, the traffic should be dropped entirely, etc.

During operation, tap device 112 may create pseudo Transmission Control Protocol (TCP) and/or User Datagram Protocol (UDP) traffic streams based on the received data traffic 108/110, and provide the pseudo traffic streams to tap interface 302. The pseudo traffic streams may also include the corresponding decrypted payload(s) of the traffic, as part of decrypted traffic 304. For example, the pseudo streams may be based on the address of the client device (e.g., the IP address of the client, the MAC address of the client), the address of the server (e.g., the IP address of the server, the MAC address of the server), the TCP or UDP ports associated with the data 108/110, etc.

In various embodiments, intrusion analysis devices 306 may listen promiscuously to tap interface 302 for any of the pseudo traffic streams generated by tap device 112. In turn, each of intrusion analysis devices 306 may determine whether or not the device should analyze the pseudo traffic on interface 302 (e.g., according to a policy in control settings 245). In one embodiment, such a policy may dictate that each of intrusion analysis devices 306 should analyze all traffic on interface 306 or a given subset of the traffic. In another embodiment, another policy may dictate which of intrusion analysis devices 306 are to analyze the pseudo traffic stream, based on the type of traffic. For example, a first intrusion analysis device 306 may analyze only HTTP traffic, a second intrusion analysis device 306 may only analyze email traffic, a third intrusion analysis device 306 may analyze only non-HTTP traffic, etc.

As would be appreciated, architecture 300 may be implemented in a manner that is agnostic to the actual analysis policies or rules used by intrusion analysis devices 306 to analyze the pseudo streams of traffic. In other words, intrusion analysis devices 306 may require only minimal configuration to begin analyzing traffic pushed to interface 302 and may analyze the pseudo streams in a manner similar to that of actual streams of traffic in the network.

Referring now to FIG. 3B, any or all of the intrusion analysis devices 306 may make a security decision based on the pseudo stream of traffic provided by tap device 112 to tap interface 302. In turn, the intrusion analysis device(s) 306 may provide signals 308 back to tap device 112 indicative of the analysis results. In some embodiments, signals 308 may further comprise command signals that indicate an action to be performed by tap device 112 or another networking device on data 108/110. For example, the first intrusion analysis device 306 may signal to tap device 112 via signal 308 that tap device 112 should reset the connection of the traffic, block the traffic, drop the traffic, whitelist the traffic (e.g., to prevent further decryption and/or analysis of the traffic), log the traffic, adjust a differentiated services code point (DSCP) or type-of-service field of the traffic, adjust network resource allocations for the traffic (e.g., bandwidth, etc.), etc.

In some embodiments, an intrusion analysis device 306 may send signals 308 as one or more control TCP or UDP control packets. Such packets may, for example, include the exact 4-tuple of the packets in the pseudo TCP or UDP stream generated by tap device 112, thereby indicating to tap device 112 the particular traffic analyzed by intrusion analysis device 306. The TCP/UDP control packets may also signal an action to tap device 112 via one or more TCP or UDP option fields in the header of the packets. Correspondingly, tap device 112 may perform the indicated action on the actual traffic.

As the delivery of a TCP control packet may be unreliable, the sending intrusion analysis device 306 may continue to send the packet until tap device 112 acknowledges the packet or detects a change in the pseudo stream of traffic on tap interface 302. For example, if signal 308 includes a command to tap device 112 to drop the particular traffic, intrusion analysis device 306 may determine that signal 308 was received by tap device 112 if tap device 112 ceases sending the corresponding pseudo stream of traffic via tap interface 302.

In various embodiments, signaling via a TCP or UDP control message may entail any or all of the following the following:
  a. The interaction between the intrusion analysis device 306 and tap device 112 may use IP addresses and Layer 4 ports from the pseudo connection, to identify original connection.
  b. A specific TCP or UDP option value may be used to signal a control action to tap device 112.
  c. Using appropriate protocol semantics/flags (e.g., SYN, ACK, RST, FIN flags, etc.) with the specific option value may convey to tap device 112 the action to be performed on the actual traffic. For example, such actions may include, but are not limited to, resetting the connection, dropping the connection, blocking the connection, ignoring the traffic, turning off the interception/decryption of the traffic, specific byte ranges for tap device 112, DSCP/TOS value manipulation, Bandwidth control etc.

In further embodiments, tap device 112 may maintain a dedicated and secure TCP control connection with each of intrusion analysis devices 306. In other words, a single dedicated control channel may be used to communicate with each intrusion analysis device 306 and not for each mirrored connection. Such a control channel may be used to send messages for each traffic flow that needs to be controlled. Reply messages from tap device 112 may also be used, to add reliability to this mechanism. By using dedicated connections, messages passed between tap device 112 and a given intrusion analysis device 306 may include metadata regarding the traffic, the results of the analysis, and/or the prescribed action to be performed on the original traffic flow. Such metadata may allow for even more fine-grained control over simply using TCP/UDP options to convey signals 308.

Figure 4A:
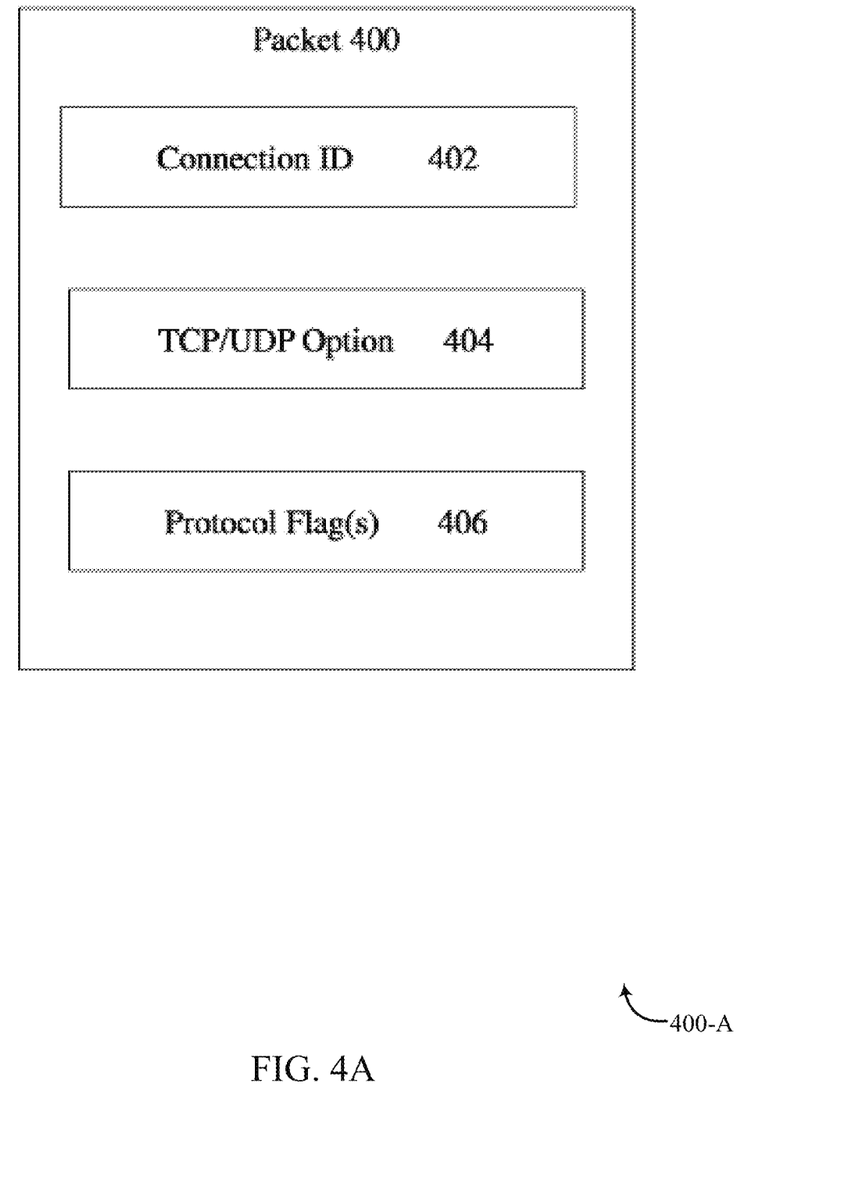
FIGS. 4A-4B illustrate example intrusion analysis result messages, according to various embodiments.
Figure 4B:
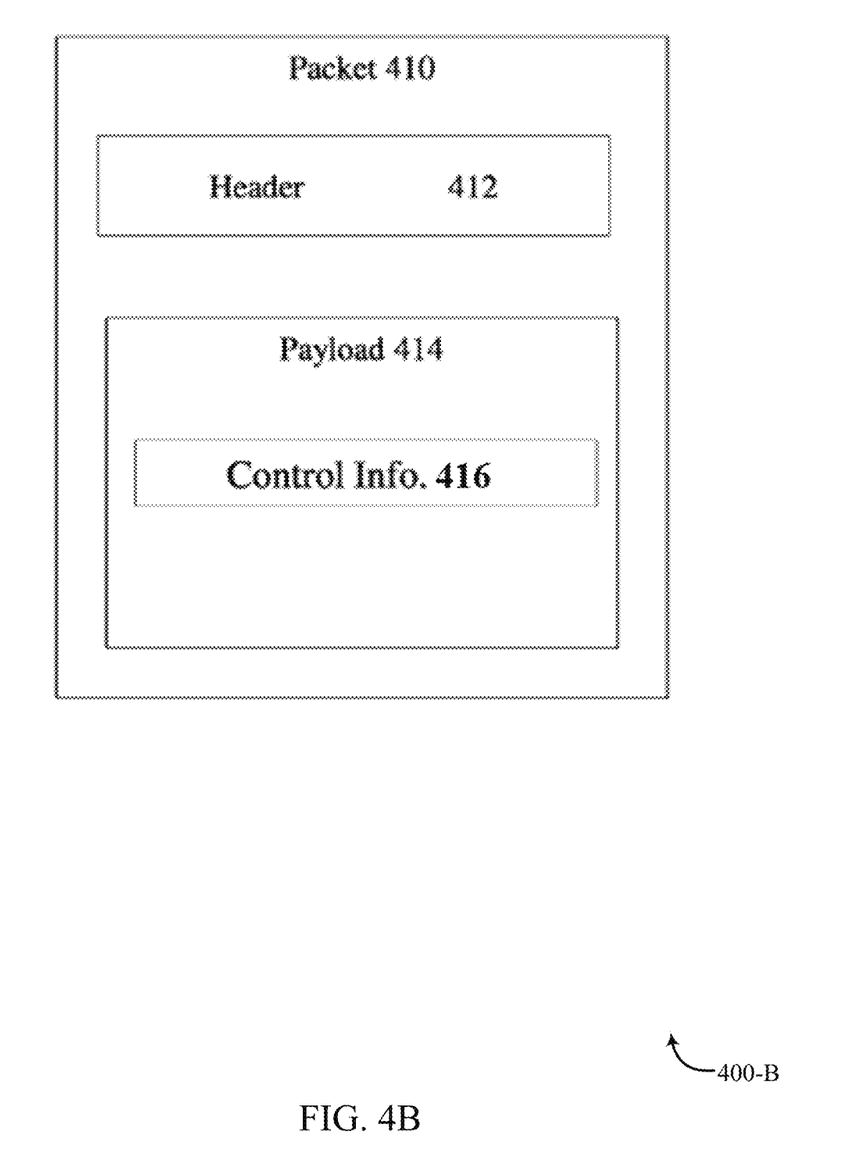

FIGS. 4A-4B illustrate example analysis result messages, according to various embodiments. In some embodiments, as shown in FIG. 4A, a packet 400 may be sent by an analysis device back to the tap device that indicates the results of the analysis and/or a prescribed action to be taken regarding the traffic. Generally, packet 400 may include a connection identifier (ID) 402, one or more TCP/UDP options 404, and one or more protocol flags 406. For example, data 402-406 may be conveyed within a TCP header of packet 400. In such a case, connection ID 402 may indicate the addresses/ports associated with the traffic stream analyzed by the analysis device. Similarly, protocol flags 406 may be set in the TCP flags field of the TCP header. Finally, TCP/UDP options 404 may be set in the options field of the header packet (e.g., to indicate the specific actions to be taken regarding the traffic, etc.). However, as would be appreciated, the options field of a TCP header may be limited to a maximum of 320 bits.

Referring now to FIG. 4B, another example packet 410 is shown, according to various embodiments. In some embodiments, the tap device may maintain a separate, secure connection with each analysis device for purposes of control signaling. In such cases, packet 410 may be used to convey the signals. Consequently, packet 410 may not have the same size restrictions as that of control packet 400 shown in FIG. 4A.

Generally, packet 410 may include a header 412 and a payload 414 in which additional information may be included regarding the traffic. Policy may describe conditions, rules, and actions. For example, packet 410 may include information from the analysis device that may be compared against the policy, which may be used to convey the action to be performed on the original traffic, logging information, information regarding the analysis process itself (e.g., how the decrypted traffic itself was analyzed), the specific analysis action or actions performed on the traffic, etc.

Packet 410 may also include control information 416 that may be used, in some cases, in conjunction with policy to command the tap device to perform a specific action on the traffic. For example, control information 416 may instruct the tap device or another networking device to drop the traffic, whitelist the traffic, etc. The use of policy may also allow for even greater fine-tuned control over the traffic. For example, policy may be used to define the conditions, rules, parameters, etc., under which the action(s) indicated in control information 416 in should be performed on the actual traffic. Further controls may specify a time of day during which a certain action should be performed, a particular reporting format, etc.

Figure 5:
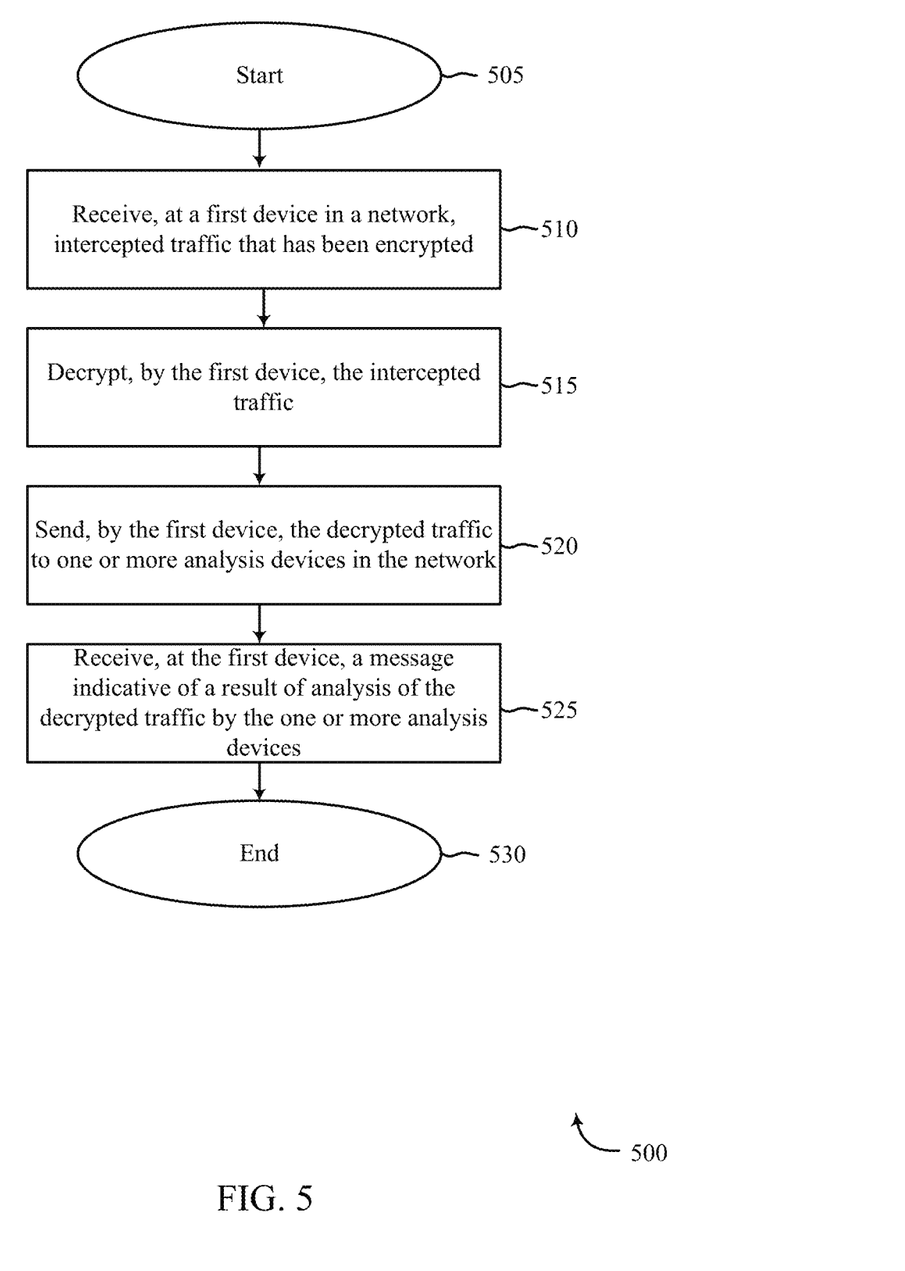
FIG. 5 illustrates an example simplified procedure for providing decrypted traffic to one or more intrusion analysis devices, according to various embodiments.

Referring now to FIG. 5, an example simplified procedure 500 is shown for providing decrypted traffic to one or more analysis devices, according to various embodiments. In some embodiments, procedure 500 may be performed by a first device having a processing circuit that executes stored machine instructions. For example, procedure 500 may be performed by a tap device or another device operable to act as an encryption tap in a network. Procedure 500 begins at step 505 and continues on to step 510 where, as described in greater detail above, the first device receives intercepted, encrypted traffic. For example, the traffic may be directed to the first device by a router or other networking device, instead of the intended destination of the traffic. In various embodiments, the first device may act as a man-in-the-middle, to establish secure connections with both the source and destination of the traffic, thereby inserting the first device into the communication chain.

At step 515, as detailed above, the first device may decrypt the intercepted traffic. Notably, if the first device operates as a man-in-the-middle, any handshaking performed between the first device and the source and destination of the traffic will provide the first device with the information needed to decrypt the intercepted traffic. For example, in the case of SSL encryption, the first device may use the keys received from the source or destination and the Master secret that resulted from the handshake, to decrypt the traffic.

At step 520, the first device may send the decrypted traffic to one or more analysis devices, as described in greater detail above. In various embodiments, the first device may implement a tap interface onto which the decrypted traffic may be pushed. Correspondingly, any number of analysis devices may listen promiscuously to the tap interface for traffic, to receive the decrypted traffic for analysis. In some cases, the tap interface may be operable to allow any number of analysis devices to receive the traffic simultaneously (e.g., as opposed to following a service chain where one device performs an analysis, then the next, etc.).

At step 525, as detailed above, the first device may receive a message indicative of the result(s) of the traffic analysis by the analysis devices. In some embodiments, the message may simply indicate whether a particular analysis device deems the traffic as a potential threat. In such cases, any action to be taken by the first device may be determined locally by the first device, in response to receiving the message. In further embodiments, the message may identify one or more actions to be taken by the first device. For example, the received message may instruct the first device to drop the traffic, reset the connection, etc.

In some embodiments, the first device may receive the message of step 525 via a TCP control message that uses existing TCP header fields to convey information back to the first device, such as the action to be performed on the traffic. For example, the message may be a TCP ACK sent by the analysis device with certain flags/fields set, to specify to the first device which action to take. In other embodiments, a dedicated communication link may be established between the first device and each analysis device. In such cases, the message may be more sophisticated and carry additional information such as metadata, etc., regarding the analysis and/or the action(s) to be taken. Procedure 500 then ends at step 530.

It should be noted that while certain steps within procedure 500 may be optional as described above, the steps shown in FIG. 5 are merely examples for purposes of illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide an architecture in which an encryption tap device may insert between two devices attempting to communicate securely. By doing so, the encryption tap device may be able to decrypt the intercepted traffic and pass the decrypted traffic onto a tap interface. Any number of traffic/intrusion analysis devices listening to the tap interface may then analyze the traffic, to determine whether the traffic is malicious or otherwise undesirable. In turn, the one or more analysis devices may signal back to the tap device the results of the analysis (e.g., in the form of an instruction to perform a particular action on the traffic, etc.).

As will be appreciated, the above examples are intended only for the understanding of certain aspects of the techniques herein and are not limiting in nature. While the techniques are described primarily with respect to a particular device or system, the described processes may be executed by other devices according to further implementations. For example, while the techniques herein are described primarily with respect to SSL encryption, the techniques may be applied to any number of other encryption paradigms, such as the Datagram Transport Layer Security (DTLS) mechanism, Secure Shell (SSH), or the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method for controlling encrypted traffic flows using out-of-path analysis devices, comprising:
   receiving, at a first device in a network, intercepted traffic that has been encrypted;
   decrypting, by the first device, the intercepted traffic;
   sending, by the first device, the decrypted traffic to one or more analysis devices in the network;
   receiving, at the first device, a message indicative of a result of analysis of the decrypted traffic by the one or more analysis devices, the message further identifying an action to be performed by the first device on the traffic; and
   performing, by the first device, the indicated action on the traffic, the indicated action comprising at least one of: logging the traffic, adjusting a differentiated services code point (DSCP), adjusting a type-of-service field of the traffic, or adjusting a bandwidth associated with the traffic, or any combination thereof.

2. The method as in claim 1, wherein the indicated action further comprises at least one of: dropping the traffic, or stopping decryption of the traffic.

3. The method as in claim 1, wherein the message indicates the action to be performed using a transport control protocol (TCP) option field and one or more TCP flags, wherein the message further identifies a pseudo-connection associated with the traffic at the first device.

4. The method as in claim 1, wherein the message is received via one or more dedicated control channels between the first device and the one or more analysis devices.

5. The method as in claim 4, wherein the message comprises metadata regarding the result of the analysis of the traffic by the one or more analysis devices.

6. The method as in claim 1, further comprising:
   performing, by the first device, one or more actions based at least in part on the received message.

7. The method as in claim 1, wherein the decrypted traffic comprises a decrypted payload of the traffic in plaintext format.

8. The method of claim 1, wherein the decrypted traffic comprises a re-encrypted payload of the traffic.

9. The method as in claim 1, further comprising:
selecting, by the first device, the one or more analysis devices to which the decrypted traffic is to be sent based on a type of the traffic.

10. The method as in claim 1, wherein the first device comprises the one or more analysis devices, such that the analysis of the decrypted traffic is performed by the first device.

11. An apparatus to control encrypted traffic flows using out-of-path analysis devices, comprising:
one or more network interfaces to communicate with a network;
a processor coupled to the network interfaces and configured to execute one or more processes; and
a memory configured to store a process executable by the processor, the process when executed operable to:
receive intercepted traffic that has been encrypted;
decrypt the intercepted traffic;
send the decrypted traffic to one or more analysis devices in the network;
receive a message indicative of a result of analysis of the decrypted traffic by the one or more analysis devices, the message further identifying an action to be performed by the first device on the traffic; and
perform, by the first device, the indicated action on the traffic, the indicated action comprising at least one of: logging the traffic, adjusting a differentiated services code point (DSCP), adjusting a type-of-service field of the traffic, or adjusting a bandwidth associated with the traffic, or any combination thereof.

12. The apparatus as in claim 11, wherein the message identifies an action to be performed by the apparatus on the traffic.

13. The apparatus as in claim 12,
wherein the indicated action further comprises at least one of: dropping the traffic, or stopping decryption of the traffic.

14. The apparatus as in claim 12, wherein the message indicates the action to be performed using a transport control protocol (TCP) option field and one or more TCP flags, wherein the message further identifies a pseudo-connection associated with the traffic at the apparatus.

15. The apparatus as in claim 12, wherein the message is received via one or more dedicated control channels between the apparatus and the one or more analysis devices.

16. The apparatus as in claim 15, wherein the message comprises control information regarding the result of the analysis of the traffic by the one or more analysis devices.

17. The apparatus as in claim 11, wherein the decrypted traffic comprises a decrypted payload of the traffic in plain-text format.

18. The apparatus as in claim 11, wherein the process when executed is further operable to:
select the one or more analysis devices to which the decrypted traffic is to be sent based on a type of the traffic.

19. A tangible, non-transitory, computer-readable media having software encoded thereon, the software when executed by a processor of a first device is operable to:
receive intercepted traffic that has been encrypted;
decrypt the intercepted traffic;
send the decrypted traffic to one or more analysis devices in the network;
receive a message indicative of a result of analysis of the decrypted traffic by the one or more analysis devices, the message further identifying an action to be performed by the first device on the traffic; and
perform, by the first device, the indicated action on the traffic, the indicated action comprising at least one of: logging the traffic, adjusting a differentiated services code point (DSCP), adjusting a type-of-service field of the traffic, or adjusting a bandwidth associated with the traffic, or any combination thereof.

* * * * *